United States Patent
Lim et al.

(10) Patent No.: US 12,504,780 B2
(45) Date of Patent: Dec. 23, 2025

(54) DISPLAY DEVICE

(71) Applicant: Samsung Display Co., LTD., Yongin-si (KR)

(72) Inventors: Ho Lim, Yongin-si (KR); Taemin Kim, Yongin-si (KR); Jiyun Park, Yongin-si (KR); Donggeun Shin, Yongin-si (KR); Gihoon Yang, Yongin-si (KR); Seulgee Lee, Yongin-si (KR); Seunghee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 266 days.

(21) Appl. No.: 18/141,108

(22) Filed: Apr. 28, 2023

(65) Prior Publication Data

US 2024/0118727 A1    Apr. 11, 2024

(30) Foreign Application Priority Data

Sep. 19, 2022   (KR) .................. 10-2022-0117779

(51) Int. Cl.
*G02F 1/1333* (2006.01)
*G06F 1/16* (2006.01)
*H10K 50/00* (2023.01)
*H10K 85/40* (2023.01)
*H10K 85/60* (2023.01)

(52) U.S. Cl.
CPC .......... *G06F 1/1616* (2013.01); *G06F 1/1656* (2013.01); *H10K 50/401* (2023.02); *H10K 85/40* (2023.02); *H10K 85/656* (2023.02)

(58) Field of Classification Search
CPC .... G02F 1/1333; G03F 7/0752; G06F 1/1616; C08G 77/04
See application file for complete search history.

(56) References Cited

U.S. PATENT DOCUMENTS

2024/0118727 A1*  4/2024  Lim ................ H10K 50/401

FOREIGN PATENT DOCUMENTS

| CN | 109390288 A | | 2/2019 | |
| KR | 2013067532 | * | 6/2013 | ............. G02B 6/00 |
| KR | 101400284 B1 | | 5/2014 | |
| KR | 1020210002173 A | | 1/2021 | |
| KR | 102311889 B1 | | 10/2021 | |
| KR | 1020220000014 A | | 1/2022 | |
| KR | 102385232 B1 | | 4/2022 | |

OTHER PUBLICATIONS

Ni et al., "Holographic polymer nanocomposites with ordered structures and improved electro-optical performance by doping POSS", Jun. 12, 2019, Composites Part B, 174, 10705, pp. 1-9. (Year: 2019).*

* cited by examiner

*Primary Examiner* — Geraldina Visconti
(74) *Attorney, Agent, or Firm* — CANTOR COLBURN LLP

(57) ABSTRACT

A display device includes: a display panel having a non-folding area and a foldable area adjacent to the non-folding area; and a protective film disposed under the display panel, including a polyhedral oligomeric silsesquioxane (POSS) compound, and having a break elongation of about 20% or more.

10 Claims, 8 Drawing Sheets

DISPLAY DEVICE

This application claims priority to Korean Patent Application No. 10-2022-0117779, filed on Sep. 19, 2022, and all the benefits accruing therefrom under 35 U.S.C. § 119, the content of which in its entirety is herein incorporated by reference.

BACKGROUND

1. Field

Embodiments provide generally to a display device. More particularly, embodiments provide a foldable display device.

2. Description of the Related Art

As information technology develops, the importance of a display device, which is communication media between users and information, is being highlighted. Accordingly, the use of the display device such as a liquid crystal display device, an organic light emitting display device, a plasma display device, and the like is increasing.

A flexible display device that can be deformed into various shapes has been developed. Unlike a flat panel display, a flexible display device may be folded, bent, or rolled like paper. The flexible display device may be easy to carry and improve user convenience. Among flexible display devices, a foldable display device may be in the limelight. The foldable display device may be repeatedly folded and unfolded.

SUMMARY

Embodiments provide a display device having improved impact resistance strength.

A display device according to embodiments of the present disclosure includes: a display panel having a non-folding area and a foldable area adjacent to the non-folding area; and a protective film disposed under the display panel, including a polyhedral oligomeric silsesquioxane ("POSS") compound, and having a break elongation of about 20% or more.

In an embodiment, the protective film may have a Young's modulus of about 1 gigapascal (Gpa) or more.

In an embodiment, the protective film may have a thickness of about 10 micrometers (μm) to about 100 μm.

In an embodiment, the POSS compound may include at least one selected from a group consisting of compounds represented by Chemical Formula 1 to Chemical Formula 9:

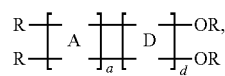

[Chemical Formula 1]

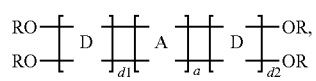

[Chemical Formula 2]

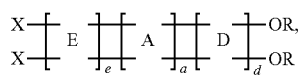

[Chemical Formula 3]

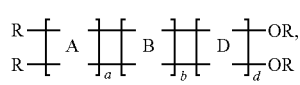

[Chemical Formula 4]

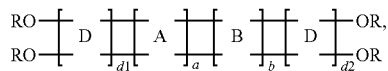

[Chemical Formula 5]

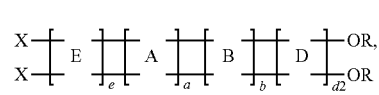

[Chemical Formula 6]

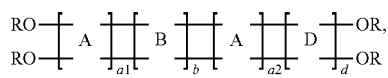

[Chemical Formula 7]

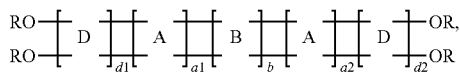

[Chemical Formula 8]

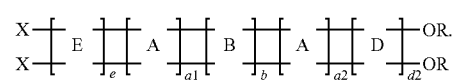

[Chemical Formula 9]

In Chemical Formula 1 to Chemical Formula 9, A may be

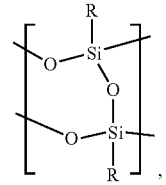

B may be

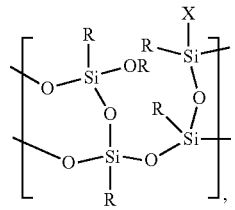

D may be

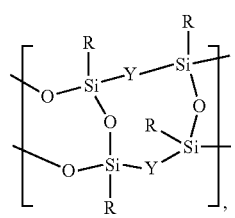

E may be

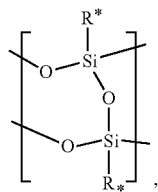

X may be each independently R or [$(SiO_{3/2}R)_{4+2n}O$], Y may be O, NR or [$(SiO_{3/2}R)_{4+2n}O$], R and R* may be each independently hydrogen, heavy hydrogen, a halogen, an amine group, an epoxy group, a cyclohexyl epoxy group, an acrylic group, a methacrylic group, a thiol group, an isocyanate group, a nitrile group, a nitro group, phenyl group, a C1 to C12 alkyl group, a C2 to C12 alkenyl group, a C1 to C40 alkoxy group, a C3 to C12 cycloalkyl group, a C3-12 heterocycloalkyl group, a C6 to C12 aryl group, a C3 to C12 heteroaryl group, a C3 to C12 aralkyl group, a C3 to C12 aryloxy group, or a C3 to C12 aryl thiol group. The phenyl group may include substituted or unsubstituted hydrogen, heavy hydrogen, a halogen, an amine group, an epoxy group, a cyclohexyl epoxy group, an acryl group, a methacryl, a thiol group, an isocyanate group, a nitrile group, or a nitro group, and the R and R* may be different from each other. a, a1, a2, d, d1, and d2 may be each independently an integer between 1 and 100,000, b may be each independently an integer between 1 and 500, and e may be each independently an integer 1 or 2.

In an embodiment, the protective film may directly contact the display panel.

In an embodiment, the protective film may include a flat portion overlapping the non-folding area and a plurality of pattern portions overlapping the foldable area and spaced apart from each other.

In an embodiment, the protective film may overlap the non-folding area and does not overlap the foldable area.

In an embodiment, the protective film may be formed through an inkjet process.

In an embodiment, the display device may further include a support member disposed under the protective film and including a stretchable portion in which a plurality of openings are defined.

In an embodiment, each of the plurality of openings may have a shape extending in a first direction, and the plurality of openings may be arranged in the first direction and a second direction perpendicular to the first direction.

A display device according to embodiments of the present disclosure includes: a display panel having a non-folding area and a foldable area adjacent to the non-folding area; and a protective film disposed under the display panel and having a break elongation of about 20% or more.

In an embodiment, the protective film may have a Young's modulus of about 1 Gpa or more.

In an embodiment, the protective film may have a thickness of about 10 μm to about 100 μm.

In an embodiment, the protective film may include at least one selected from a group consisting of compounds represented by Chemical Formula 1 to Chemical Formula 5:

[Chemical Formula 1]

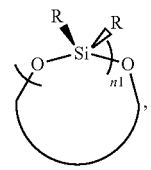

[Chemical Formula 2]

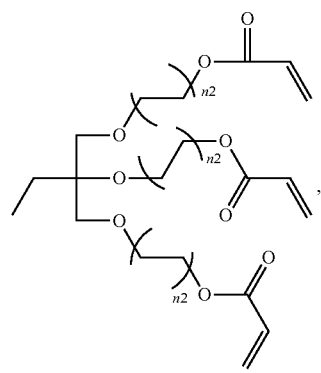

[Chemical Formula 3]

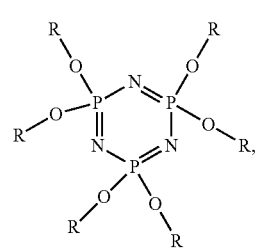

[Chemical Formula 4]

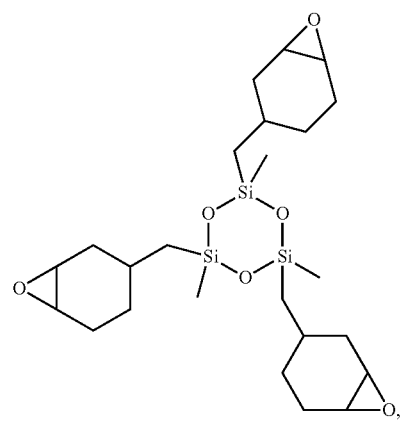

-continued

[Chemical Formula 5]

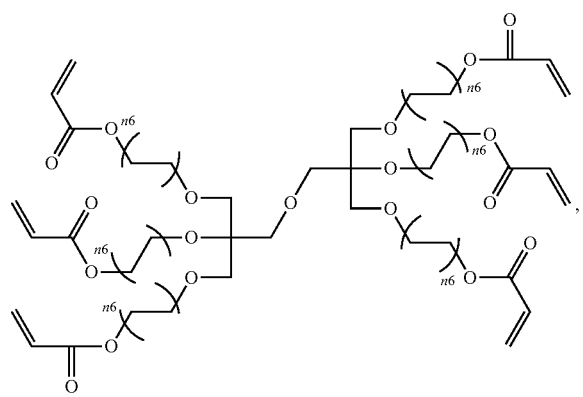

n1 may be an integer between 1 and 20 in Chemical Formula 1, n2 may be an integer between 1 and 4 in Chemical Formula 2, R may be one selected from

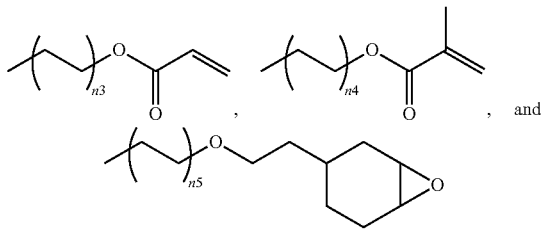

, and in Chemical Formula 1 and Chemical Formula 3. n3, n4, and n5 may be each an integer between 1 and 20 in R, and n6 may be an integer between 1 and 20 in Chemical Formula 5.

In an embodiment, the protective film may directly contact the display panel.

In an embodiment, the protective film may include a flat portion overlapping the non-folding area and a plurality of pattern portions overlapping the foldable area and spaced apart from each other.

In an embodiment, the protective film may overlap the non-folding area and does not overlap the foldable area.

In an embodiment, the protective film may be formed through an inkjet process.

In an embodiment, the display device may further include a support member disposed under the protective film and including a stretchable portion in which a plurality of openings are defined.

In an embodiment, each of the plurality of openings may have a shape extending in a first direction, and the plurality of openings may be arranged in the first direction and a second direction perpendicular to the first direction.

A display device according to an embodiment of the present disclosure includes a display panel having a non-folding area and a foldable area adjacent to the non-folding area, and a protective film disposed under the display panel to protect the display panel and including a material having high elasticity and high elongation. Accordingly, the impact resistance strength of the display device may be effectively improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
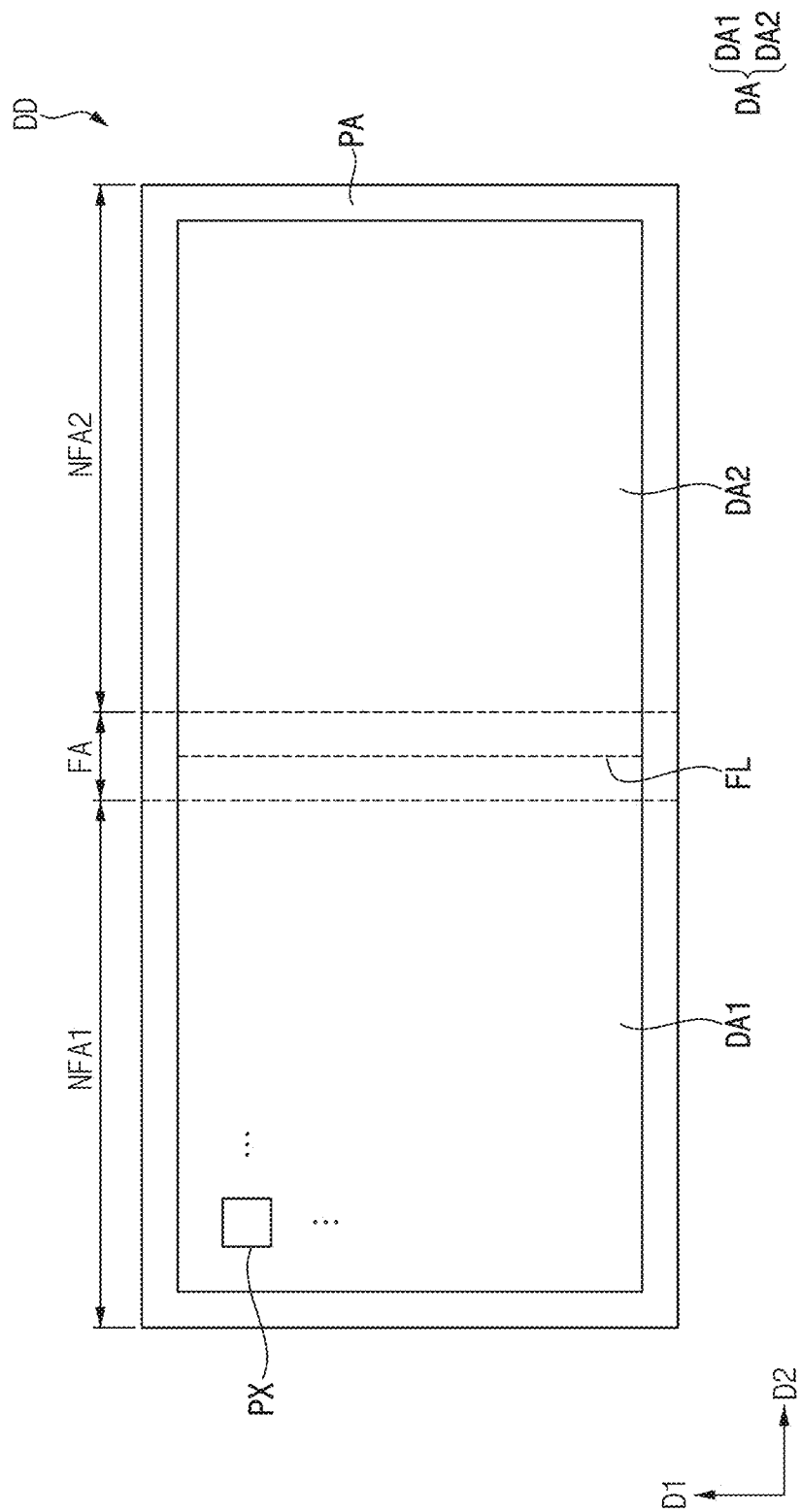
FIG. 1 is a plan view illustrating a display device according to an embodiment.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, a display device and a method of manufacturing the display device according to embodiments of the present disclosure will be explained in detail with reference to the accompanying drawings. The same reference numerals are used for the same components in the drawings, and redundant descriptions of the same components will be omitted.

Figure 2:
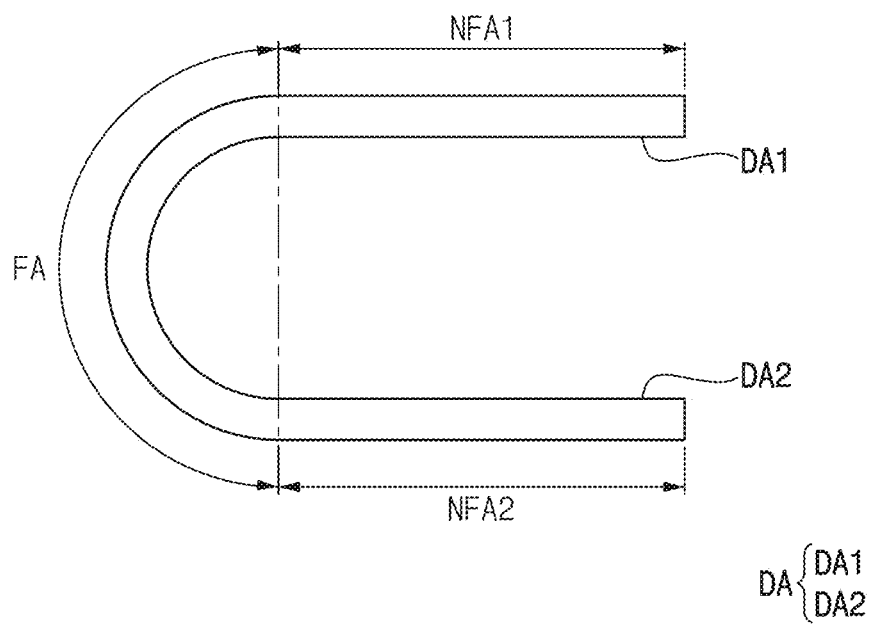
FIGS. 2 and 3 are cross-sectional views illustrating a folded state of the display device of FIG. 1.
Figure 3:
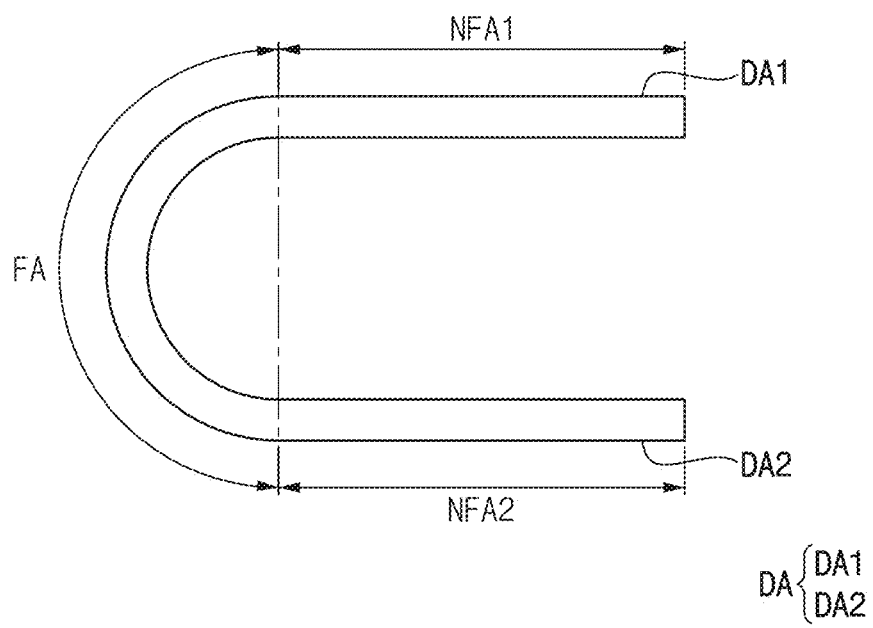

FIG. 1 is a plan view illustrating a display device according to an embodiment. FIGS. 2 and 3 are cross-sectional views illustrating a folded state of the display device of FIG. 1.

Referring to FIGS. 1, 2, and 3, a display device DD according to an embodiment of the present disclosure may include a display area DA and a peripheral area PA. The peripheral area PA may be located around the display area DA. For example, the peripheral area PA may surround at least a portion of the display area DA.

A plurality of pixels PX may be disposed in the display area DA. Specifically, each of the plurality of pixels PX may be disposed in a pixel area NPA located in the display area DA. Each of the plurality of pixels PX may emit light. As each of the plurality of pixels PX emits light, the display area DA may display an image. For example, each of the plurality of pixels PX may include a transistor and a light emitting element electrically connected to the transistor.

The plurality of pixels PX may be repeatedly arranged along a first direction D1 and a second direction D2 intersecting the first direction D1 in a plan view. For example, the first direction D1 may be perpendicular to the second direction D2.

A driver may be disposed in the peripheral area PA. The driver may provide signals and/or voltages to the plurality of pixels PX. For example, the driver may include a data driver, a gate driver, and the like. The peripheral area PA may not display an image.

At least a portion of the display device DD may be flexible, and the flexible portion (i.e., a foldable area FA) may be folded. That is, the display area DA includes a foldable area FA that can be bent by an external force to fold the display device DD and a non-folding area NFA1 and NFA2 adjacent to at least one side of the foldable area FA and not folded. For example, the foldable area FA may have a folding line FL extending along the first direction D1. Here, the non-folding area is referred to as a non-folding area, but this is for convenience of description. The expression "non-folding" includes not only a hard case without flexibility but also a case that is flexible but not folded due to flexibility smaller than the foldable area FA.

The display area DA may be divided into a first display area DA1 and a second display area DA2 adjacent in the second direction D2 crossing the first direction D1. The first display area DA1 and the second display area DA2 may be continuously connected to substantially form one display area DA. For example, when the display area DA is folded along the folding line FL, as shown in FIG. 2, the display device DD may have an in-folding structure so that the first display area DA1 and the second display area DA2 face each other. Alternatively, when the display area DA is folded along the folding line FL, as shown in FIG. 3, the display device DD may have an out-folding structure so that the first display area DA1 and the second display area DA2 are disposed outside.

Figure 4:
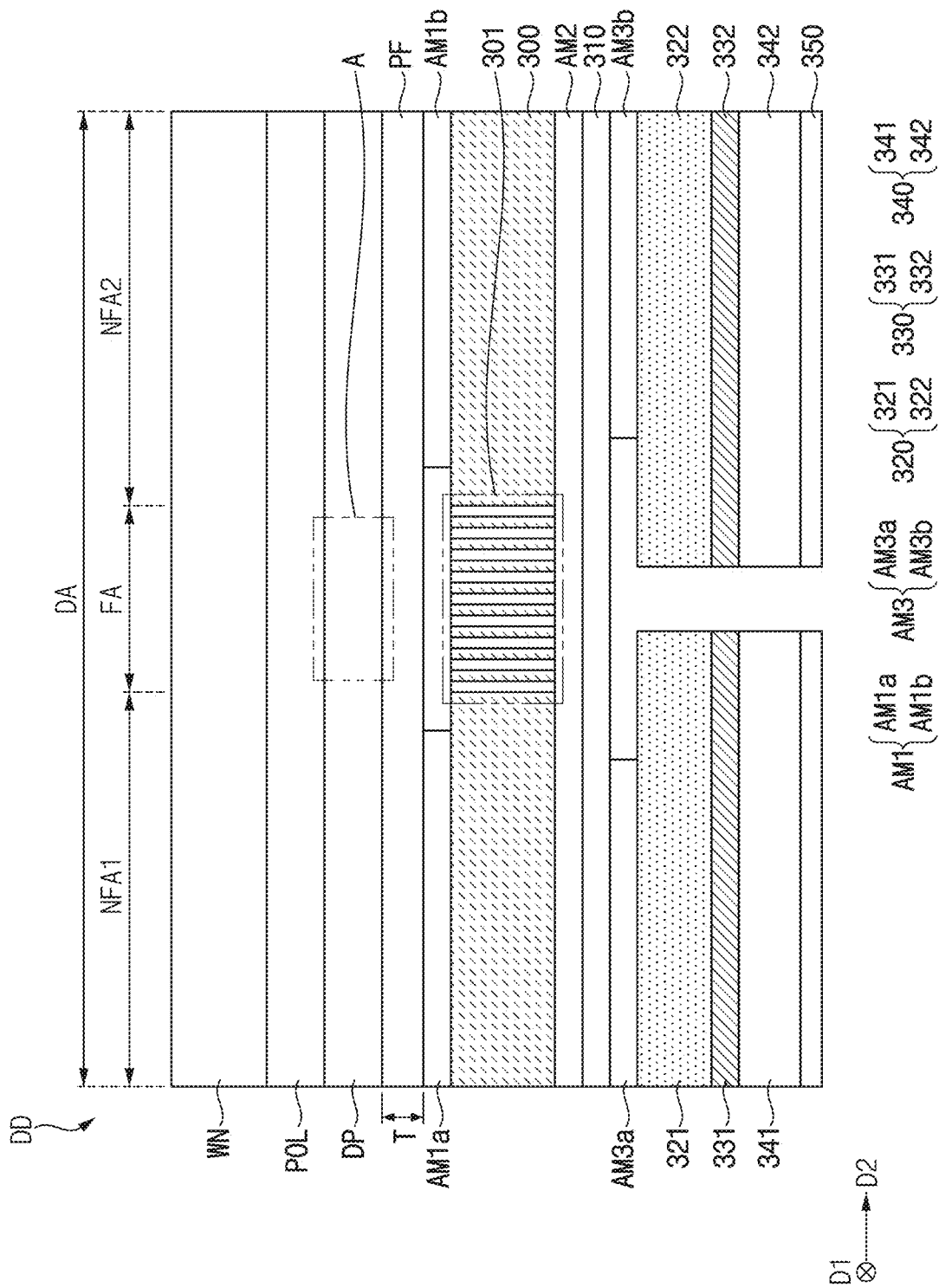
FIG. 4 is a cross-sectional view schematically illustrating the display device of FIG. 1.

FIG. 4 is a cross-sectional view schematically illustrating the display device of FIG. 1.

Referring to FIG. 4, the display device DD according to an embodiment may include a window member WN, a polarizing member POL, a display panel DP, a protective film PF, a first adhesive member AM1, a first support member 300, a second adhesive member AM2, an elastic member 310, a third adhesive member AM3, a second support member 320, a heat dissipation member 330, a shock absorption member 340, and an insulating member 350.

As described above, the display device DD may include the foldable area FA and the non-folding areas NFA1 and NFA2. As the display device DD includes the foldable area FA and the non-folding areas NFA1 and NFA2, components included in the display device DD (e.g., the display panel DP) may also include the foldable area FA and the non-folding areas NFA1 and NFA2.

The polarizing member POL may be disposed on the display panel DP. As the display device 100 includes the foldable area FA, the display panel DP may also have the foldable area FA. The display panel DP may include a plurality of sub-pixels (e.g., pixels PX of FIG. 1) that generate light. The polarizing member POL may block external light incident on the display panel DP from the outside.

The window member WN may be disposed on the polarizing member POL. The window member WN may have a transmitting portion corresponding to the display area DA. For example, the window member WN may include a polymer material or a glass thin film so as to be bendable. These may be used alone or in combination with each other.

The protective film PF may be disposed under the display panel DP. For example, the protective film PF may overlap the foldable area FA and the non-folding areas NFA1 and NFA2. The protective film PF may protect a lower portion of the display panel DP. In an embodiment, an upper surface of the protective film PF may directly contact a lower surface of the display panel DP. That is, an adhesive layer for contacting the display panel DP and the protective film PF may not be disposed between the display panel DP and the protective film PF.

A material for forming the protective film PF may be directly coated on the lower portion of the display panel DP, and the coated material may be cured with heat or light to form the protective film PF. For example, the protective film PF may be formed through an inkjet process. However, the configuration of the present disclosure is not limited thereto.

In order to improve impact resistance strength of the display device DD, the protective film PF may include a material having high elasticity and high elongation. In an embodiment, the protective film PF may include a polyhedral oligomeric silsesquioxane ("POSS") compound. For example, the POSS compound may include at least one of compounds represented by Chemical Formula 1 to Chemical Formula 9:

[Chemical Formula 1]
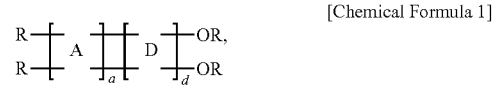

[Chemical Formula 2]
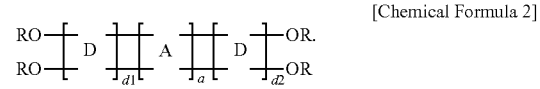

[Chemical Formula 3]
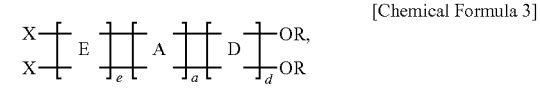

-continued

[Chemical Formula 4]
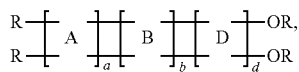

[Chemical Formula 5]
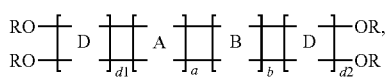

[Chemical Formula 6]
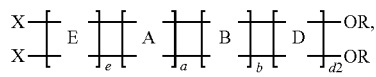

[Chemical Formula 7]
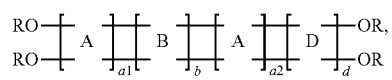

[Chemical Formula 8]
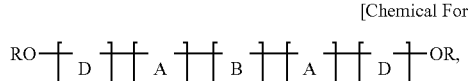

[Chemical Formula 9]
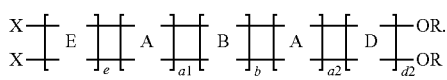

In Chemical Formula 1 to Chemical Formula 9, A may be

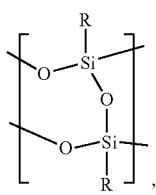

B may be

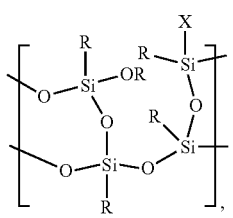

D may be

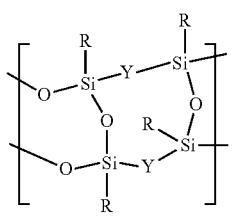

E may be

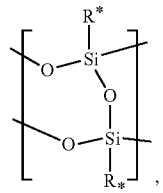

X may be each independently R or $[(SiO_{3/2}R)_{4+2n}O]$, Y may be O, NR or $[(SiO_{3/2}R)_{4+2n}O]$, R and R* may be each independently hydrogen, heavy hydrogen, a halogen, an amine group, an epoxy group, a cyclohexyl epoxy group, an acrylic group, a methacrylic group, a thiol group, an isocyanate group, a nitrile group, a nitro group, phenyl group, a C1 to C12 alkyl group, a C2 to C12 alkenyl group, a C1 to C40 alkoxy group, a C3 to C12 cycloalkyl group, a C3-12 heterocycloalkyl group, a C6 to C12 aryl group, a C3 to C12 heteroaryl group, a C3 to C12 aralkyl group, a C3 to C12 aryloxy group, or a C3 to C12 aryl thiol group. The phenyl group may include substituted or unsubstituted hydrogen, heavy hydrogen, a halogen, an amine group, an epoxy group, a cyclohexyl epoxy group, an acryl group, a methacryl, a thiol group, an isocyanate group, a nitrile group, or a nitro group, and the R and R* may be different from each other. a, a1, a2, d, d1, and d2 may be each independently an integer between 1 and 100,000, b may be each independently an integer between 1 and 500, and e may be each independently an integer 1 or 2.

In another embodiment, the protective film PF may include at least one of compounds represented by Chemical Formula 10 to Chemical Formula 14:

[Chemical Formula 10]
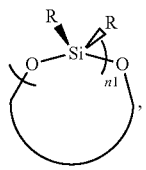

[Chemical Formula 11]
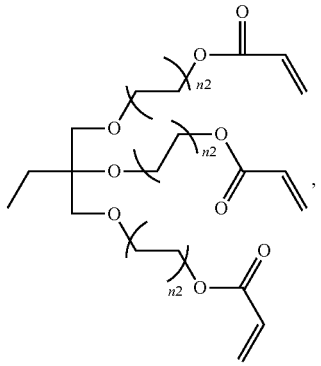

[Chemical Formula 12]
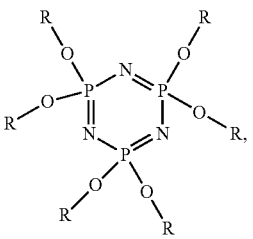

-continued

[Chemical Formula 13]

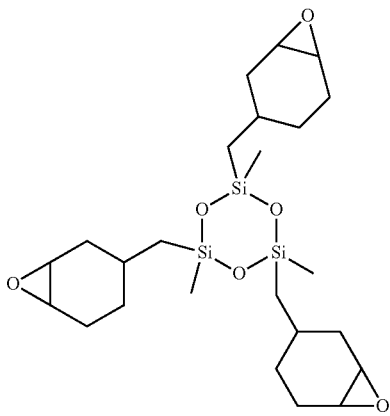

[Chemical Formula 14]

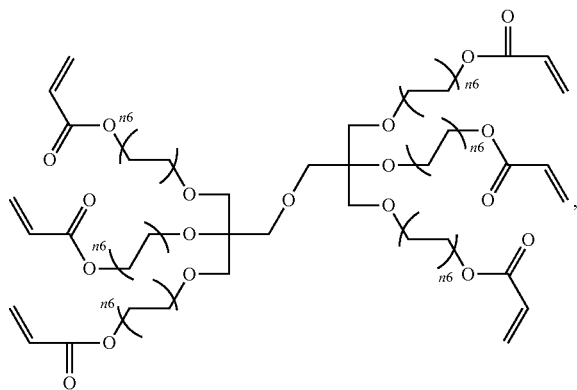

n1 may be an integer between 1 and 20 in Chemical Formula 10, n2 may be an integer between 1 and 4 in Chemical Formula 11, R may be one selected from

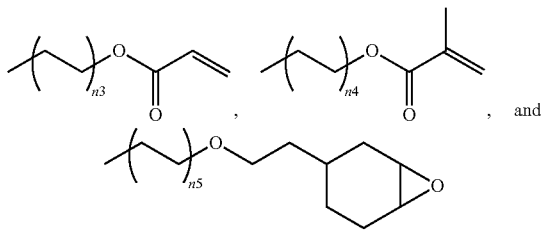

in Chemical Formula 10 and Chemical Formula 12. n3, n4, and n5 may be each an integer between 1 and 20 in R, and n6 may be an integer between 1 and 20 in Chemical Formula 14.

However, the composition of the present disclosure is not limited thereto, and the protective film PF may include various materials having high elasticity and high elongation properties.

In an embodiment, a Young's modulus of the protective film PF may be about 1 gigapascal (Gpa) or more. Preferably, the Young's modulus of the protective film PF may be about 1 Gpa or more and about 60 Gpa or less. In addition, in an embodiment, a break elongation of the protective film PF may be about 20% or more. Preferably, the break elongation of the protective film PF may be about 20% or more and about 100% or less. When the protective film PF satisfies the above conditions, the impact resistance strength of the display device DD may be effectively improved.

In an embodiment, the thickness T of the protective film PF may be about 10 micrometers (μm) to about 100 μm. If the thickness T of the protective film PF is less than about 10 μm, the impact resistance strength of the display device DD may be reduced. When the thickness T1 of the protective film PF is greater than about 100 μm, the folding of the display device DD may not be smooth.

The first adhesive member AM1 may be disposed between the protective film PF and the first support member 300. The first adhesive member AM1 may include a first adhesive layer AM1a and a second adhesive layer AM1b spaced apart from each other. Specifically, the first adhesive layer AM1a and the second adhesive layer AM1b may be spaced apart from each other in the second direction D2. Each of the first adhesive layer AM1a and the second adhesive layer AM1b may not overlap the foldable area FA. Alternatively, each of the first adhesive layer AM1a and the second adhesive layer AM1b may partially overlap the foldable area FA.

An upper surface of the first adhesive member AM1 may directly contact the protective film PF, and a lower surface of the first adhesive member AM1 may directly contact the first support member 300. Accordingly, the first adhesive member AM1 may attach the protective film PF and the first support member 300.

For example, the first adhesive member AM1 may include an optical clear adhesive ("OCA"), a pressure sensitive adhesive ("PSA"), a photocurable resin, a thermosetting resin, or the like. These may be used alone or in combination with each other.

The first support member 300 may be disposed under the protective film PF. In an embodiment, the first support member 300 may include a stretchable portion 301 overlapping the foldable area FA. The stretchable portion 301 may have elasticity in response to folding and unfolding of the display device 100. In addition, the stretchable portion 301 may have a lattice shape. However, although FIG. 4 shows one stretchable portion 301, the configuration of the present disclosure is not limited thereto. For example, a plurality of stretchable portions 301 may be formed. A detailed description of the stretchable portion 301 will be described later.

The first support member 300 may serve to support the display panel DP. In addition, the first support member 300 may serve to assist folding of the display panel DP. For example, the first support member 300 may support the display panel DP by being entirely disposed on the lower surface of the display panel DP, and the stretchable portion 301 overlapping the foldable area FA may help fold the display panel DP.

The first support member 300 may include metal, alloy, glass, plastic, or the like. For example, the first support member 300 may include stainless steel ("SUS"). Alternatively, the first support member 300 may include glass fiber reinforced plastic ("GFRP"), carbon fiber reinforced plastic ("CFRP"), or the like. These may be used alone or in combination with each other. However, the configuration of the present disclosure is not limited thereto, and the first support member 300 may include other materials.

The elastic member 310 may be disposed under the first support member 300. Specifically, the elastic member 310 may be disposed between the first support member 300 and the second support member 320. The elastic member 310 may be disposed to overlap the foldable area FA. While the display device DD is repeatedly folded and unfolded, the elastic member 310 may prevent foreign matter from penetrating into a portion of the first support member 300 overlapping the foldable area FA. In addition, while the display device DD repeatedly performs folding and unfolding, the elastic member 310 may be stretched and contracted so as not to expose a portion of the first support member 300 overlapping the foldable area FA.

For example, the elastic member 310 may include an elastic polymer having a relatively large elastic force or a relatively large restoring force. For example, the elastic member 310 may include an elastic material such as silicone, urethane, thermoplastic polyurethane ("TPU"), and the like. These may be used alone or in combination with each other.

The second adhesive member AM2 may be disposed between the first support member 300 and the elastic member 310. An upper surface of the second adhesive member AM2 may directly contact the first support member 300 and a lower surface of the second adhesive member AM2 may directly contact the elastic member 310. Accordingly, the second adhesive member AM2 may attach the first support member 300 and the elastic member 310 to each other.

The third adhesive member AM3 may be disposed between the elastic member 310 and the second support member 320. The third adhesive member AM3 may include a third adhesive layer AM3a and a fourth adhesive layer AM3b spaced apart from each other. Specifically, the third adhesive layer AM3a and the fourth adhesive layer AM3b may be spaced apart from each other in the second direction D2. Each of the third adhesive layer AM3a and the fourth adhesive layer AM3b may not overlap the foldable area FA. The third adhesive layer AM3a may attach the elastic member 310 and a first support layer 321 of the second support member 320, and the fourth adhesive layer AM3b may attach the elastic member 310 and a second support layer 322 of the second support member 320.

For example, each of the second adhesive member AM2 and the third adhesive member AM3 may include an optically transparent adhesive, a pressure-sensitive adhesive, a photocurable resin, a thermosetting resin, or the like. These may be used alone or in combination with each other.

The second support member 320 may be disposed under the elastic member 310. The second support member 320 may include the first support layer 321 and the second support layer 322 spaced apart from each other. Specifically, the first support layer 321 and the second support layer 322 may be spaced apart from each other in the second direction D2. Each of the first support layer 321 and the second support layer 322 may partially overlap the foldable area FA.

For example, when the display device DD is folded, a distance between the first support layer 321 and the second support layer 322 of the second support member 320 may increase. The second support member 320 may prevent the stretchable portion 301 of the first support member 300 overlapping the foldable area FA from being pressed.

The second support member 320 may include metal, alloy, glass, plastic, or the like. For example, the second support member 320 may include stainless steel ("SUS"). Alternatively, the second support member 320 may include glass fiber reinforced plastic ("GFRP"), carbon fiber reinforced plastic ("CFRP"), or the like. These may be used alone or in combination with each other. However, the configuration of the present disclosure is not limited thereto, and the second support member 320 may include other materials.

The heat dissipation member 330 may be disposed under the second support member 320. The heat dissipation member 330 may include a first heat dissipation layer 331 and a second heat dissipation layer 332 spaced apart from each other. Specifically, the first heat dissipation layer 331 and the second heat dissipation layer 332 may be spaced apart from each other in the second direction D2. An upper surface of the first heat dissipation layer 331 may directly contact the first support layer 321, and an upper surface of the second heat dissipation layer 332 may directly contact the second support layer 322. Each of the first heat dissipation layer 331 and the second heat dissipation layer 332 may partially overlap the foldable area FA. The heat dissipation member 330 may include a material having high thermal conductivity. For example, the heat dissipation member 330 may include aluminum (Al), copper (Cu), or the like. These may be used alone or in combination with each other. In another embodiment, the heat dissipation member 330 may be omitted.

The shock absorption member 340 may be disposed under the heat dissipation member 330. The shock absorption member 340 may include a first cushion layer 341 and a second cushion layer 342 spaced apart from each other. Specifically, the first cushion layer 341 and the second cushion layer 342 may be spaced apart from each other in the second direction D2. Each of the first cushion layer 341 and the second cushion layer 342 may partially overlap the foldable area FA. An upper surface of the first cushion layer 341 may directly contact the first heat dissipation layer 331, and an upper surface of the second cushion layer 342 may directly contact the second heat dissipation layer 332.

The shock absorption member 340 may protect the display panel DP from external impact. In addition, the shock absorption member 340 may include a ductile material so that the display device DD can be easily folded. For example, the shock absorption member 340 may include a foam material such as polyurethane foam, polystyrene foam, and the like. These may be used alone or in combination with each other.

The insulating member 350 may be disposed under the shock absorption member 340. For example, the insulating member 350 may be formed in the form of a film or tape. The insulating member 350 may prevent rattle from occurring in the display device DD.

Figure 5:
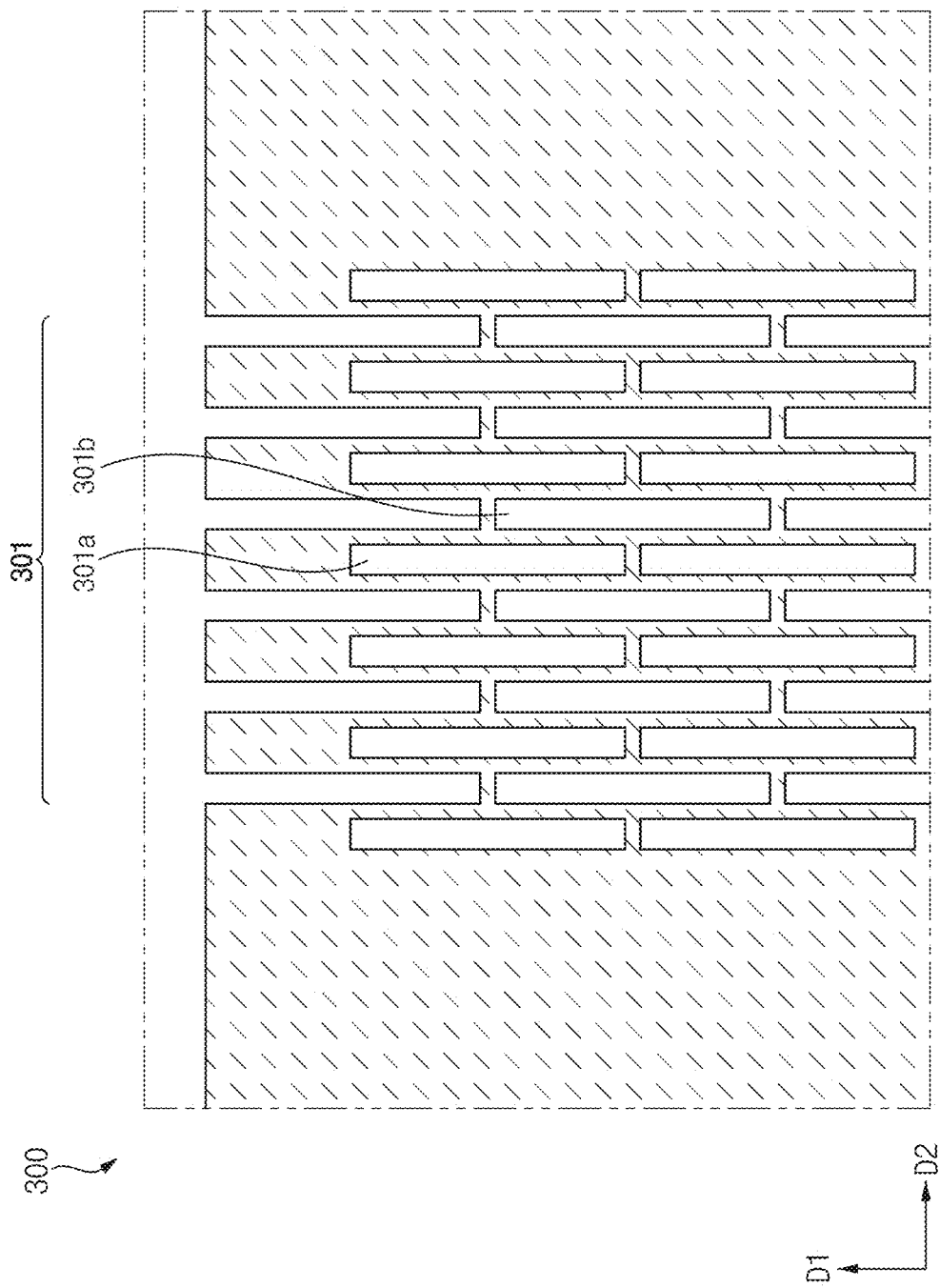
FIG. 5 is an enlarged plan view of a portion of a first support member of FIG. 4.

FIG. 5 is an enlarged plan view of a portion of a first support member of FIG. 4.

Referring to FIG. 5, the first support member 300 may include the stretchable portion 301 having a lattice shape. For example, a plurality of openings 301a and 301b may be defined in the stretchable portion 301. In an embodiment, the plurality of openings 301a and 301b may have a shape extending in the first direction D1 and the second direction D2 perpendicular to the first direction D1. In addition, so that the plurality of openings 301a and 301b form a staggered arrangement as a whole, the second openings 301b adjacent to the first openings 301a in the second direction D2 may be shifted along the second direction D2 from the first openings 301a.

Figure 6:
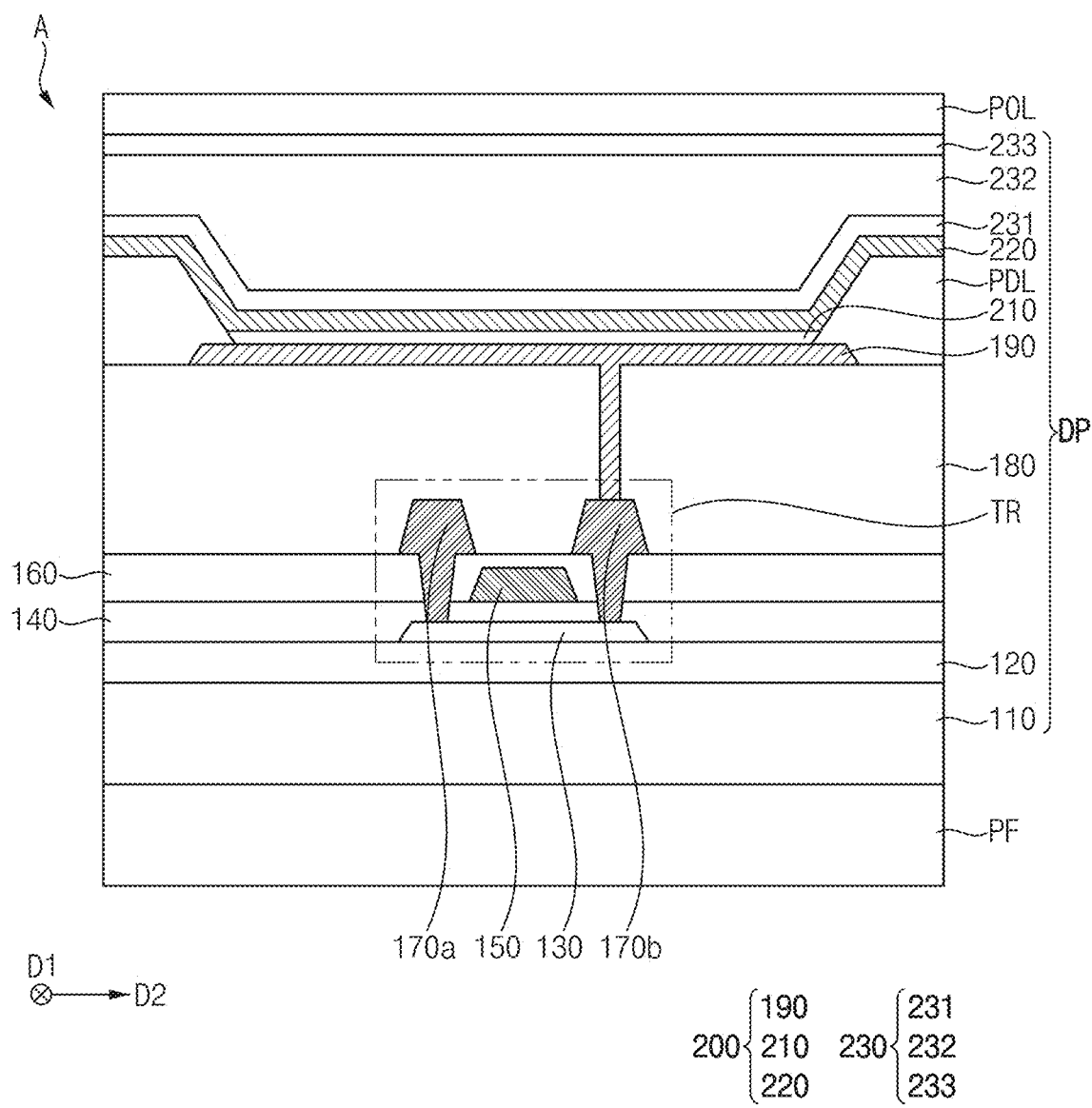
FIG. 6 is an enlarged cross-sectional view of area A of FIG. 4.

FIG. 6 is an enlarged cross-sectional view of area A of FIG. 4.

Referring to FIG. 6, the display panel DP of the display device DD according to an embodiment of the present disclosure may include a substrate 110, a buffer layer 120, a gate insulating layer 140, a transistor TR, an interlayer-insulating layer 160, a planarization layer 180, a pixel defining layer PDL, a light emitting element 200, and an encapsulation layer 230.

Here, the transistor TR may include an active layer 130, a gate electrode 150, a source electrode 170a, and a drain electrode 170b, the light emitting element 200 may include a lower electrode 190, a light emitting layer 210, and an upper electrode 220, and the encapsulation layer 230 may include a first thin film encapsulation layer 231, a second thin film encapsulation layer 232, and a third thin film encapsulation layer 233.

The substrate 110 may include a transparent material or an opaque material. The substrate 110 may include a flexible transparent resin substrate. An example of a transparent resin substrate that can be used as the substrate 110 may include a polyimide substrate. Alternatively, the substrate 110 may include a quartz substrate, a synthetic quartz substrate, a calcium fluoride substrate, a soda-lime glass substrate, an alkali-free glass substrate, or the like. These may be used alone or in combination with each other.

The buffer layer 120 may be disposed on the substrate 110. The buffer layer 120 may prevent diffusion of metal atoms or impurities from the substrate 110 into the transistor TR. For example, the buffer layer 120 may include an inorganic material such as silicon oxide, silicon nitride, and the like. These may be used alone or in combination with each other.

The active layer 130 may be disposed on the buffer layer 120. The active layer 130 may include a metal oxide semiconductor, an inorganic semiconductor (e.g., amorphous silicon, poly silicon), or an organic semiconductor. The active layer 130 may include a source region, a drain region, and a channel region located between the source region and the drain region.

The metal oxide semiconductor may include a two-component compound ($AB_x$), a ternary compound ($AB_xC_y$), a four-component compound ($AB_xC_yD_z$), or the like containing indium (In), zinc (Zn), gallium (Ga), tin (Sn), titanium (Ti), aluminum (Al), hafnium (Hf), zirconium (Zr), magnesium (Mg), or the like. For example, the metal oxide semiconductor may include zinc oxide ($ZnO_x$), gallium oxide ($GaO_x$), tin oxide ($SnO_x$), indium oxide ($InO_x$), indium gallium oxide ("IGO"), indium zinc oxide ("IZO"), indium tin oxide ("ITO"), indium zinc tin oxide ("IZTO"), indium gallium zinc oxide ("IGZO"), or the like. These may be used alone or in combination with each other.

The gate insulating layer 140 may be disposed on the buffer layer 120. The gate insulating layer 140 may sufficiently cover the active layer 130 on the substrate 110 and may have a substantially flat upper surface without creating a step around the active layer 130. Alternatively, the gate insulating layer 140 may cover the active layer 130 on the substrate 110 and may be disposed along the profile of the active layer 130 with a uniform thickness. For example, the gate insulating layer 140 may include silicon oxide ($SiO_x$), silicon nitride ($SiN_x$), silicon carbide ($SiC_x$), silicon oxynitride ($SiO_xN_y$), silicon oxycarbide ($SiO_xC_y$), or the like. These may be used alone or in combination with each other.

The gate electrode 150 may be disposed on the gate insulating layer 140. The gate electrode 150 may overlap the channel region of the active layer 130 in a plan view. For example, the gate electrode 150 may include a metal, an alloy, a metal nitride, a conductive metal oxide, a transparent conductive material, or the like. These may be used alone or in combination with each other.

The interlayer-insulating layer 160 may be disposed on the gate insulating layer 140. The interlayer-insulating layer 160 may sufficiently cover the gate electrode 150 on the substrate 110 and may have a substantially flat top surface without creating a step around the gate electrode 150. Alternatively, the interlayer-insulating layer 160 may cover the gate electrode 150 on the substrate 110 and may be disposed along the profile of the gate electrode 150 with a uniform thickness. For example, the interlayer-insulating layer 160 may include silicon oxide, silicon nitride, silicon carbide, silicon oxynitride, silicon oxycarbide, or the like. These may be used alone or in combination with each other.

The source electrode 170a and the drain electrode 170b may be disposed on the interlayer-insulating layer 160. The source electrode 170a may be connected to the source region of the active layer 130 through a contact hole formed by removing a first portion of the gate insulating layer 140 and the interlayer-insulating layer 160, and the drain electrode 170b may be connected to the drain region of the active layer 130 through a contact hole formed by removing a second portion of the gate insulating layer 140 and the interlayer-insulating layer 160. For example, each of the source electrode 170a and the drain electrode 170b may include a metal, an alloy, a metal nitride, a conductive metal oxide, a transparent conductive material, or the like. These may be used alone or in combination with each other.

Accordingly, the transistor TR including the active layer 130, the gate electrode 150, the source electrode 170a and the drain electrode 170b may be disposed in the display area DA on the substrate 110.

The planarization layer 180 may be disposed on the interlayer-insulating layer 160. The planarization layer 180 may sufficiently cover the source electrode 170a and the drain electrode 170b. The planarization layer 180 may include an organic material or an inorganic material. In an embodiment, the planarization layer 180 may include an organic material. For example, the planarization layer 180 may include an organic material such as polyimide-based resin, photoresist, polyacryl-based resin, polyamide-based resin, siloxane-based resin, and the like. These may be used alone or in combination with each other.

The lower electrode 190 may be disposed on the planarization layer 180. The lower electrode 190 may be connected to the drain electrode 170b through a contact hole formed by removing a portion of the planarization layer 180. For example, the lower electrode 190 may include a metal, an alloy, a metal nitride, a conductive metal oxide, a transparent conductive material, or the like. These may be used alone or in combination with each other. For example, the lower electrode 190 may operate as an anode.

The pixel defining layer PDL may be disposed on the planarization layer 180. An opening exposing a portion of the lower electrode 190 may be defined in the pixel defining layer PDL. The pixel defining layer PDL may include an organic material or an inorganic material. For example, the pixel defining layer PDL may include an organic material such as polyimide-based resin, photoresist, polyacrylic resin, polyamide-based resin, siloxane-based resin, and the like. These may be used alone or in combination with each other. Alternatively, the pixel defining layer PDL may include an organic material containing a black pigment, black dye, or the like.

The light emitting layer 210 may be disposed on the lower electrode 190. The light emitting layer 210 may be disposed on the lower electrode 190 exposed by the opening. The light emitting layer 210 may be formed using at least one of light emitting materials capable of emitting red light, green light, and blue light. Alternatively, the light emitting layer 210 may emit white light as a whole by stacking a plurality of light emitting materials capable of generating different color lights such as red light, green light, and blue light.

Accordingly, the light emitting element 200 including the lower electrode 190, the light emitting layer 210, and the upper electrode 220 may be disposed on the substrate 110 in the display area DA.

The first thin film encapsulation layer 231 may be disposed on the upper electrode 220. The first thin film encapsulation layer 231 may prevent the light emitting layer 210 from being deteriorated due to penetration of moisture, oxygen, or the like. In addition, the first thin film encapsulation layer 231 may also perform a function of protecting the display panel DP from external impact. For example, the first thin film encapsulation layer 231 may include inorganic materials having flexibility.

The second thin film encapsulation layer 232 may be disposed on the first thin film encapsulation layer 231. The second thin film encapsulation layer 232 may improve flatness of the display panel DP and protect the display panel DP. For example, the second thin film encapsulation layer 232 may include flexible organic materials.

The third thin film encapsulation layer 233 may be disposed on the second thin film encapsulation layer 232. The third thin film encapsulation layer 233 together with the first thin film encapsulation layer 231 may prevent the light emitting layer 210 from being deteriorated due to penetration of moisture, oxygen, or the like. In addition, the third thin film encapsulation layer 233 may also perform a function of protecting the display panel DP from external shock together with the first thin film encapsulation layer 231 and the second thin film encapsulation layer 232. For example, the third thin film encapsulation layer 233 may include inorganic materials having flexibility.

However, although the display device DD of the present disclosure described with reference to FIGS. 4, 5, and 6 is limited to an organic light emitting display device ("OLED"), the configuration of the present disclosure is limited thereto. For example, the display device DD may include a liquid crystal display device ("LCD"), a field emission display device ("FED"), a plasma display device ("PDP"), an electrophoretic display device ("EPD"), an inorganic light emitting display device ("ILED"), or a quantum dot display device.

Hereinafter, effects of the present disclosure according to comparative examples and example will be described.

Figure 7:
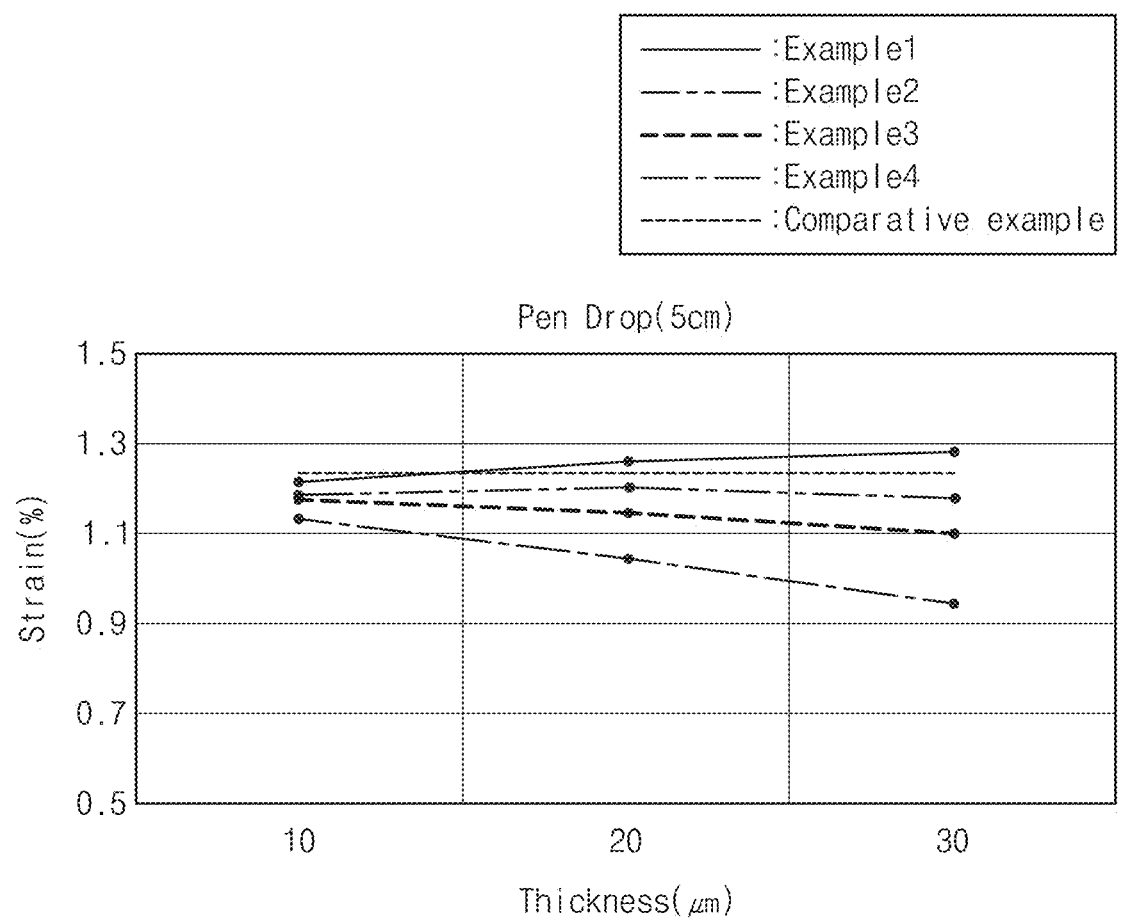
FIG. 7 is a view for explaining a change in impact resistance characteristic of a display device according to a thickness of a protective film according to comparative example and example.

FIG. 7 is a view for explaining a change in impact resistance characteristic of a display device according to a thickness of a protective film according to comparative example and example.

Referring to FIGS. 4 and 7, the protective film PF satisfying example 1 to example 4 was prepared using a polyhedral oligomeric silsesquioxane (POSS) compound, and a protective film satisfying comparative example was prepared using polyethylene terephthalate. In addition, the protective film PF satisfying the example 1 to the example 4 was formed by directly applying the POSS compound on the display panel DP and curing the applied POSS compound through heat or light curing. On the other hand, the protective film satisfying the comparative example 1 was attached to the display panel DP through a pressure sensitive adhesive ("PSA").

In Table 1 below, the example 1 to the example 4 show the Young's modulus of the protective film PF, and the comparative example 1 shows the Young's modulus of an adhesive layer formed of the pressure sensitive adhesive that attaches the protective film and the display panel DP.

In example and comparative example, the same pen was dropped from a height of about 5 centimeters (cm) from the display device DD to measure the strain of the display device DD according to the thickness T of the protective film PF.

TABLE 1

| | Young's modulus (GPa) |
|---|---|
| Example 1 | 1 |
| Example 2 | 2 |
| Example 3 | 3 |
| Example 4 | 4 |
| Comparative example 1 | $10 \times 10^{-5}$~$99 \times 10^{-5}$ |

As a result, that the strain of the display device DD satisfying the example 1 to the example 4 is relatively smaller than the strain of the display device DD satisfying the comparative example 1 may be seen.

Meanwhile, the protective film PF satisfying example 5 was prepared using a polyhedral oligomeric silsesquioxane (POSS) compound, had a thickness of about 35 μm, and a Young's modulus of about 3 Gpa. On the other hand, a protective film satisfying comparative example 2 was prepared using polyethylene terephthalate and had a thickness of about 75 μm. In addition, the protective film PF satisfying the example 5 was formed by directly applying the POSS compound on the display panel DP and curing the applied POSS compound through heat or light curing. On the other hand, the protective film satisfying the comparative example 2 was attached to the display panel DP through PSA. At this time, a thickness of the adhesive layer formed of the PSA was about 13 μm, and a Young's modulus was about $10 \times 10^{-5}$ to $99 \times 10^{-5}$.

The impact resistance characteristics of the display device DD formed using the protective film PF satisfying the example 5 and a display device formed using the protective film satisfying the comparative example 2 were evaluated.

In Table 2 below, a "pen drop" is for evaluating the impact resistance characteristics, and measuring the height at which a defect in the display device DD occurs when the same pen is dropped on the display device DD.

TABLE 2

| | Pen drop (cm) |
|---|---|
| Example 5 | 9 |
| Comparative example 2 | 3 |

From this, that when the display device DD according to the embodiment of the present disclosure includes the protective film PF formed using the POSS compound, the impact resistance strength of the display device DD is improved may be seen.

Figure 8:
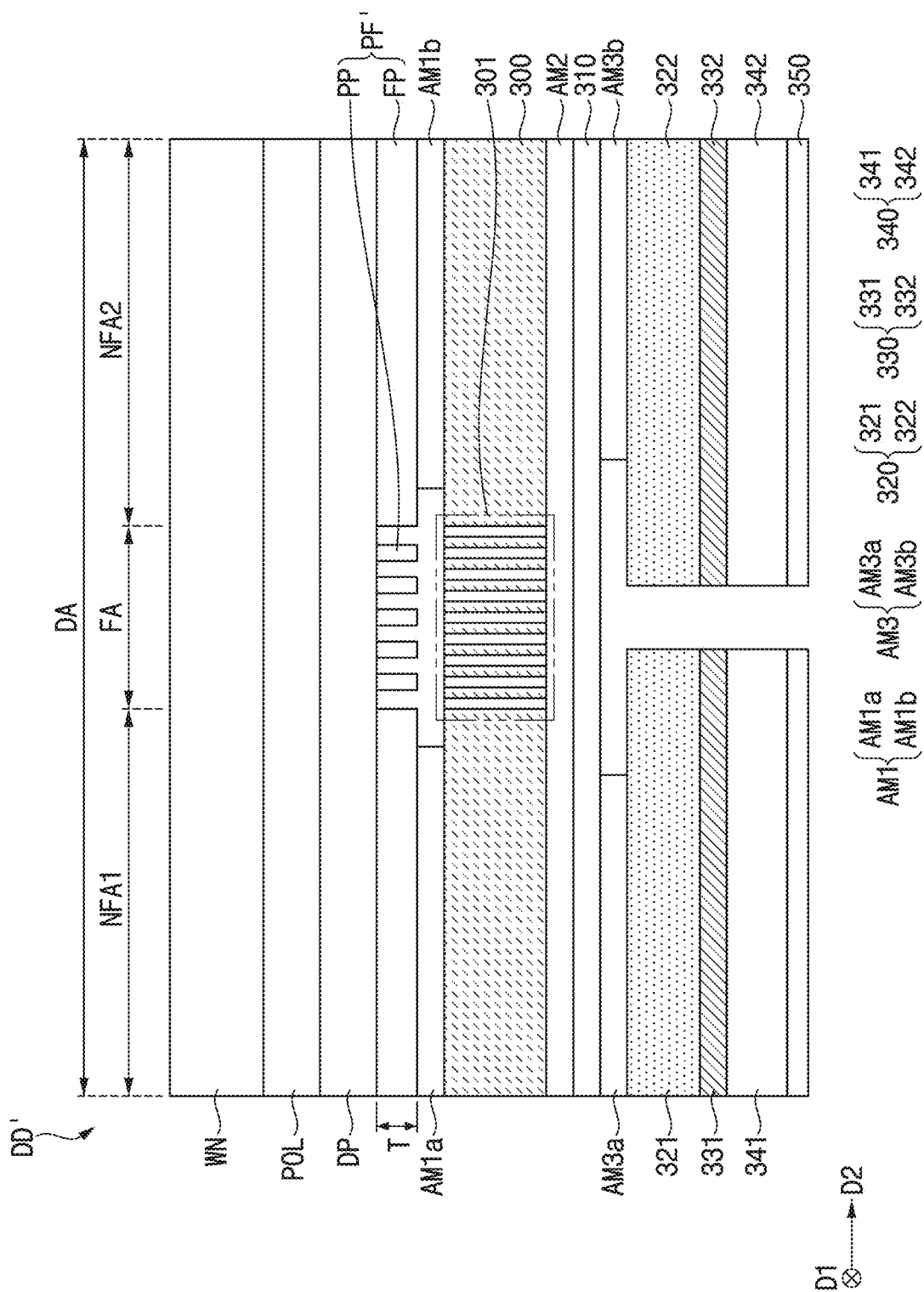
FIG. 8 is a cross-sectional view illustrating a display device according to another embodiment.

FIG. 8 is a cross-sectional view illustrating a display device according to another embodiment.

Referring to FIG. 8, a display device DD" according to another embodiment of the present disclosure may include the window member WN, the polarizing member POL, the display panel DP, a protective film PF', the first adhesive member AM1, the first support member 300, the second adhesive member AM2, the elastic member 310, the third adhesive member AM3, the second support member 320, the heat dissipation member 330, the shock absorption member 340, and the insulating member 350.

However, the display device DD' described with reference to FIG. 8 may be substantially the same as or similar to the display device DD described with reference to FIG. 4 except for the structure of the protective film PF'. In the following, redundant descriptions are omitted or simplified.

The protective film PF' may be disposed under the display panel DP The protective film PF' may include a material having high elasticity and high elongation. In an embodiment, the protective film PF' may include a flat portion FP overlapping the non-folding areas NFA1 and NFA2 and a plurality of pattern portions PP overlapping the foldable area FA and spaced apart from each other along the second direction D2. That is, the protective film PF' may be patterned at a portion overlapping the foldable area FA. Accordingly, folding of the display device DD' may be facilitated.

Figure 9:
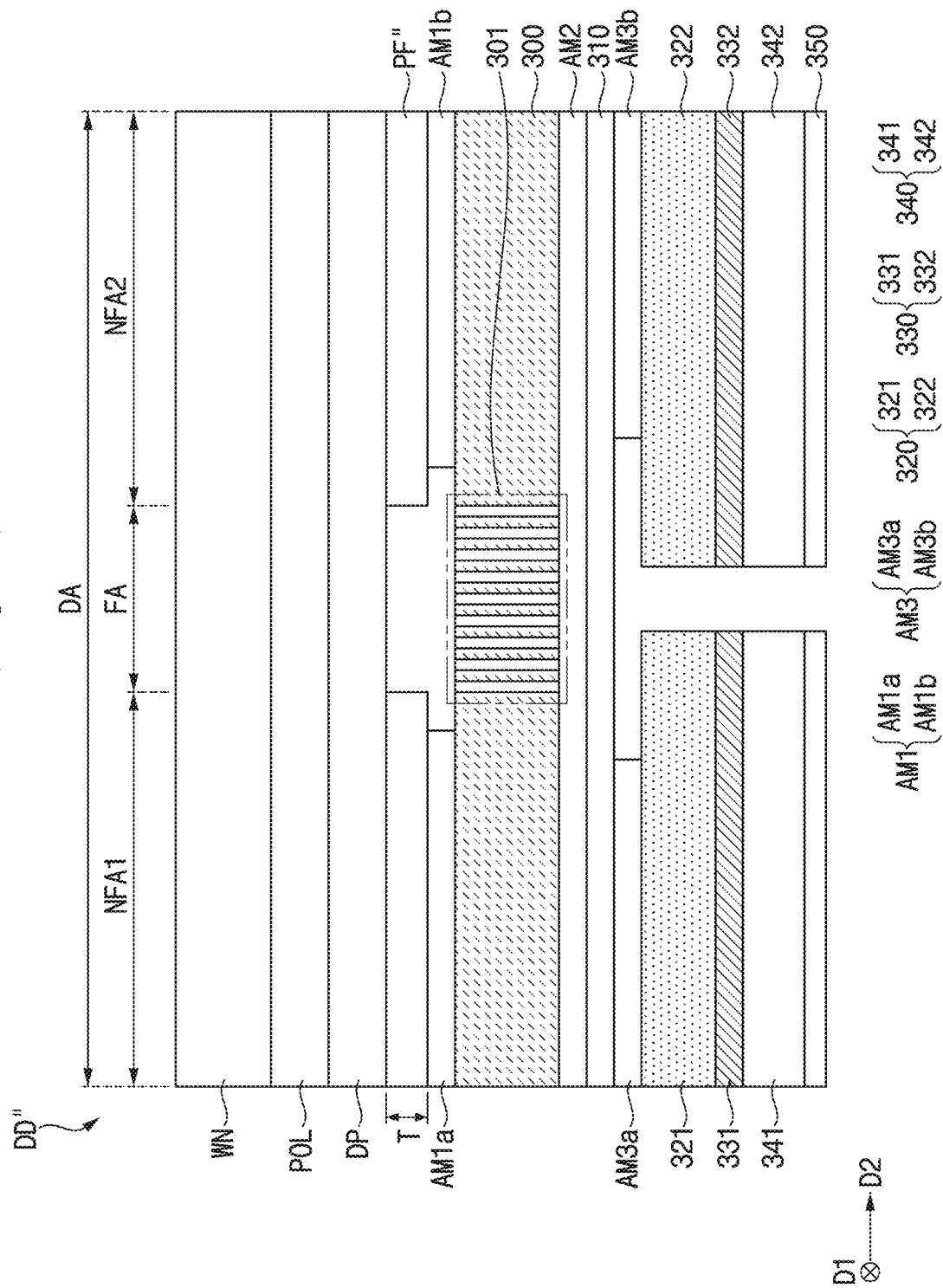
FIG. 9 is a cross-sectional view illustrating a display device according to still another embodiment.

FIG. 9 is a cross-sectional view illustrating a display device according to still another embodiment.

Referring to FIG. 8, a display device DD" according to still another embodiment of the present disclosure may include the window member WN, the polarizing member POL, the display panel DP, a protective film PF", the first adhesive member AM1, the first support member 300, the second adhesive member AM2, the elastic member 310, the third adhesive member AM3, the second support member 320, the heat dissipation member 330, the shock absorption member 340, and the insulating member 350.

However, the display device DD" described with reference to FIG. 9 may be substantially the same as or similar to the display device DD described with reference to FIG. 4 except for the structure of the protective film PF". In the following, redundant descriptions are omitted or simplified.

The protective film PF" may be disposed under the display panel DP. The protective film PF" may include a material having high elasticity and high elongation. In an embodiment, the protective film PF" may overlap the non-folding areas NFA1 and NFA2 and may not overlap the foldable area FA. That is, the protective film PF" may not be formed in the foldable area FA. Accordingly, folding of the display device DD" may be facilitated.

The present disclosure can be applied to various display devices. For example, the present disclosure is applicable to various display devices such as display devices for vehicles, ships and aircraft, portable communication devices, display devices for exhibition or information transmission, medical display devices, or the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
a display panel having a non-folding area and a foldable area adjacent to the non-folding area; and
a protective film disposed under the display panel, including a polyhedral oligomeric silsesquioxane (POSS) compound, and having a break elongation of about 20% or more.

2. The display device of claim 1, wherein the protective film has a Young's modulus of about 1 gigapascal (Gpa) or more.

3. The display device of claim 1, wherein the protective film has a thickness of about 10 micrometers (μm) to about 100 μm.

4. The display device of claim 1, the POSS compound includes at least one selected from a group consisting of compounds represented by Chemical Formula 1 to Chemical Formula 9:

[Chemical Formula 1]
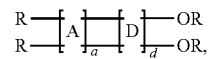

[Chemical Formula 2]
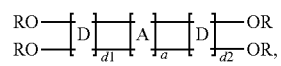

[Chemical Formula 3]
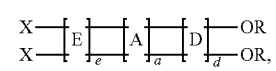

[Chemical Formula 4]
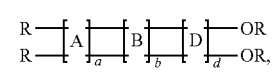

[Chemical Formula 5]

[Chemical Formula 6]

[Chemical Formula 7]

[Chemical Formula 8]
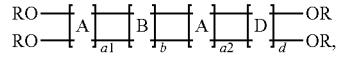

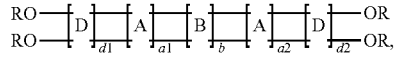

[Chemical Formula 9]
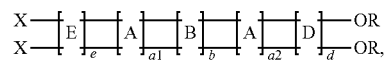

wherein in Chemical Formula 1 to Chemical Formula 9,

A is

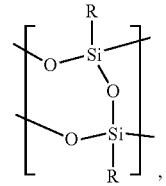

B is

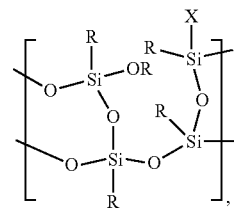

D is

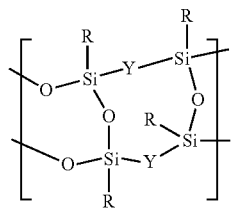

E is

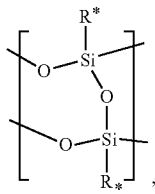

X is each independently R or $[(SiO_{3/2}R)_{4+2n}O]$, Y is O, NR or $[(SiO_{3/2}R)_{4+2n}O]$, R and R* are each independently hydrogen, heavy hydrogen, a halogen, an amine group, an epoxy group, a cyclohexyl epoxy group, an acrylic group, a methacrylic group, a thiol group, an isocyanate group, a nitrile group, a nitro group, phenyl group, a C1 to C12 alkyl group, a C2 to C12 alkenyl group, a C1 to C40 alkoxy group, a C3 to C12 cycloalkyl group, a C3-12 heterocycloalkyl group, a C6 to C12 aryl group, a C3 to C12 heteroaryl group, a C3 to C12 aralkyl group, a C3 to C12 aryloxy group, or a C3 to C12 aryl thiol group, wherein the phenyl group includes substituted or unsubstituted hydrogen, heavy hydrogen, a halogen, an amine group, an epoxy group, a cyclohexyl epoxy group, an acryl group, a methacryl, a thiol group, an isocyanate group, a nitrile group, or a nitro group, and the R and R* are different from each other, a, a1, a2, d, d1, and d2 are each independently an integer between 1 and 100,000, b is each independently an integer between 1 and 500, and e is each independently an integer 1 or 2.

5. The display device of claim 1, wherein the protective film directly contacts the display panel.

6. The display device of claim 1, wherein the protective film includes:
  a flat portion overlapping the non-folding area; and
  a plurality of pattern portions overlapping the foldable area and spaced apart from each other.

7. The display device of claim 1, wherein the protective film overlaps the non-folding area and does not overlap the foldable area.

8. The display device of claim 1, wherein the protective film is formed through an inkjet process.

9. The display device of claim 1, further comprising:
  a support member disposed under the protective film and including a stretchable portion in which a plurality of openings are defined.

10. The display device of claim 9, wherein each of the plurality of openings has a shape extending in a first direction, and the plurality of openings are arranged in the first direction and a second direction perpendicular to the first direction.

* * * * *